United States Patent [19]

Mazanek et al.

[11] 4,100,116
[45] Jul. 11, 1978

[54] POLYURETHANE FOAMS FROM POLYETHER POLYOLS WHICH CONTAIN AMIDE GROUPS

[75] Inventors: Jan Mazanek; Johannes Blahak, both of Cologne; Kuno Wagner, Leverkusen; Heinz Ziemann, Leichlingen, all of Germany

[73] Assignee: Bayer Aktiengesellschaft, Leverkusen, Germany

[21] Appl. No.: 750,492

[22] Filed: Dec. 14, 1976

[30] Foreign Application Priority Data

Dec. 31, 1975 [DE] Fed. Rep. of Germany ....... 2559372

[51] Int. Cl.$^2$ ..................... C08G 18/14; C08G 18/50; C07C 97/02; C07C 102/06
[52] U.S. Cl. ................................ 521/167; 260/557 R; 260/558 R; 260/558 A; 260/561 R; 528/60; 528/64; 528/78

[58] Field of Search ...... 260/2.5 AQ, 558 A, 2.5 AN, 260/561 A, 75 N, 77.5 AQ, 561 R, 558 R, 557 R

[56] References Cited

U.S. PATENT DOCUMENTS

| | | | |
|---|---|---|---|
| 3,574,167 | 4/1971 | Case et al. | 260/77.5 AQ |
| 3,833,641 | 9/1974 | Papa et al. | 260/77.5 AQ |
| 3,847,992 | 11/1974 | Moss | 260/77.5 AQ |
| 3,852,350 | 12/1974 | Wilson et al. | 260/557 R |

*Primary Examiner*—H.S. Cockeram
*Attorney, Agent, or Firm*—Gene Harsh; Joseph C. Gil; R. Brent Olson

[57] ABSTRACT

The instant invention relates to hydroxyl polyethers which are modified with amide groups and a method of their manufacture. The method includes a first stage wherein a portion of the hydroxyl groups of a polyether polyol are aminated and a second stage wherein the amine groups are reacted with a carboxylic acid, its anhydride, ester or halide. The modified polyesters may be used for the production of polyurethane resins.

17 Claims, No Drawings

POLYURETHANE FOAMS FROM POLYETHER POLYOLS WHICH CONTAIN AMIDE GROUPS

DESCRIPTION OF THE INVENTION

The instant invention relates to novel hydroxyl polyethers which are modified with amide groups. They contain two or more amide groups between polyether segments. The preferred linear polyether diols according to the invention are represented by the following formula

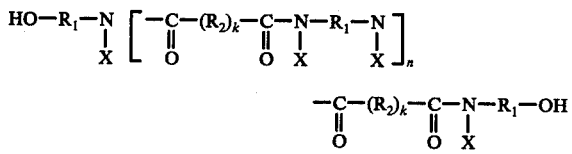

wherein
- $R_1$ represents the same or different alkylene groups having molecular weights of between 148 and 40,000 and containing at least two ether groups;
- $R_2$ represents divalent aliphatic, cycloaliphatic, araliphatic or aromatic groups having from 1 to 15 and preferably 2 to 12 carbon atoms,
- X represents hydrogen or a straight or branched chain $C_1$-$C_6$ alkyl group,
- n represents an integer of between 0 and 100, preferably between 0 and 10, and
- k represents 0 or 1.

The invention also relates to a two stage process for the preparation of polyether polyols containing amide groups. In the first stage of the process, a portion of the hydroxyl groups of a polyether polyol are converted into amino and/or alkylamino and/or arylamino groups. In the second stage the amino groups in the resulting partially aminated polyether polyol are completely amidated by a reaction with a polycarboxylic acid and/or its anhydride, ester or halide.

Finally, the invention also relates to the use of the modified polyether polyols obtained according to the invention for the production of polyurethane resins.

The partial amination of polyether polyols in the first stage of the process according to the invention may be carried out by methods known per se. The preferred method is by direct reaction of the polyether polyols with ammonia and/or primary amines in the presence of catalysts under pressure. The procedure is similar to that described in German Offenlegungsschriften Nos. 1,570,542; 2,412,056 and 1,412,057; British Pat. No. 1,159,962 and U.S. Pat. Nos. 3,838,076 and 3,847,992, the disclosures of which are incorporated herein by reference. Alternatively, aminoalkylated polyethers may be obtained by cyanoethylation of polyether polyols as described in U.S. Pat. No. 2,401,607, the disclosure of which is incorporated herein by reference, followed by catalytic hydrogenation of the nitrile groups. Polyethers with arylamino end groups can be prepared by a method similar to the method given in German Offenlegungsschrift No. 2,019,432, the disclosure of which is incorporated herein by reference, by reacting polyether polyols with a less than equivalent quantity of isatoic acid anhydride.

The polyether polyols are generally aminated to an extent of about 10 to 95%, and preferably 20 to 80%, in the first stage of the process according to the invention. It is apparent that at low percentages of amination part of the polyol put into the process will not be aminated at all. The end product then obtained is a mixture of unmodified and modified polyether polyols. For some purposes, it may be advantageous to use such mixtures for the production of polyurethane resins.

Apart from oligoethylene glycols and oligopropylene glycols, the polyether polyols used according to the invention may be polyethers containing at least 2, and generally 2 to 8 and preferably 2 to 3 hydroxyl groups. Such polyethers can be obtained by known methods, e.g. by polymerization of epoxides such as ethylene oxide, propylene oxide, butylene oxide, tetrahydrofuran, styrene oxide or epichlorohydrin. The epoxides may be started on their own, e.g. in the presence of boron trifluoride, or by chemical addition, either as mixtures or successively, to starting components which contain reactive hydrogen atoms. Suitable starting components include water, alcohols or amines, e.g. ethylene glycol, propylene glycol-(1,3) or -(1,2), trimethylolpropane, 4,4'-dihydroxydiphenylpropane, aniline, ammonia, ethanolamine or ethylene diamine. Other polyether polyols which may be used according to the invention include sucrose polyethers such as those described, for example, in German Auslegeschriften Nos. 1,176,358 and 1,064,938. Polyethers modified with vinyl polymers may also be used. These can be obtained, for example, by polymerization of styrene and acrylonitrile in the presence of polyethers as described in U.S. Pat. Nos. 3,383,351; 3,304,273; 3,523,093 and 3,110,695 and in German Pat. No. 1,152.536. Polybutadienes containing hydroxyl groups are also suitable.

The preferred polyethers according to the invention are polyethylene oxide, polypropylene oxide, polytetrahydrofuran and copolyethers of ethylene oxide and propylene oxide.

The average molecular weights of the polyether polyols used for the amination reaction are generally between about 150 and 40,000, preferably 500 to 8000 and most preferably 800 to 6000.

Amidation of the partially aminated polyethers (2nd stage of the process according to the invention) is carried out by reaction with carboxylic acids or carboxylic acid derivatives such as esters, anhydrides or halides having a functionality in the sense of the amidation reaction of from 2 to 4. Preferably dibasic carboxylic acids, or their esters, anhydrides or halides are used. Even more preferable are the acid chlorides used in the process according to the invention. Non-limiting examples of suitable carboxylic acids include oxalic acid, succinic acid, adipic acid, suberic acid, sebacic acid, phthalic acid, isophthalic acid, trimellitic acid, pyromellitic acid, tetrahydrophthalic acid, hexahydrophthalic acid, tetrachlorophthalic acid, endomethylene tetrahydrophthalic acid, 4,4'-diphenylmethane dicarboxylic acid, 4,4'-diphenylether dicarboxylic acid, naphthalene-1,5-dicarboxylic acid and derivatives thereof. Suitable derivatives are e.g. the corresponding acid anhydrides, the corresponding acid halides especially chlorides or the corresponding acid $C_1$-$C_4$-alkylesters especially methylesters. Amidation agents bearing more than one different reactive groups such as dicarboxylic acid monohalides or tricarboxylic acid monoanhydrides may also be used.

If the starting components used for the amidation reaction are exclusively bifunctional, the polyether diols obtained have the general formula already described above:

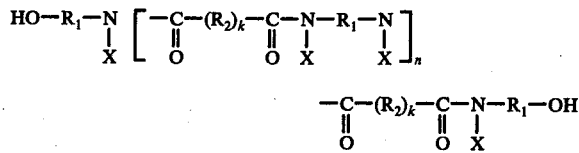

Amidation is carried out in known manner by mixing the partially aminated polyether polyol with polycarboxylic acid or its derivatives, optionally in the presence of inert organic solvents (preferably toluene, dioxane, tetrahydrofuran, halogenated alkanes, dimethylformamide or N-methyl-pyrrolidone) at temperatures of between 0° and 250° C.

In the preferred embodiment, acid halides are used as amidating agents. The reaction will readily take place at temperatures of about 0° to 50° C, but room temperature is preferred. The hydrogen halide liberated in the reaction is bound by salt formation with an at least equivalent quantity of an organic or inorganic base (preferably potassium or sodium hydroxide or sodium bicarbonate). The salt thereby formed can be removed from the reaction product by filtration. Any solvents used in the reaction may be removed by evaporation at reduced pressure. The amidating agent is preferably used in a quantity of about 1.0 to 1.05 equivalents based on the total content of optionally different groups which are reactive in the sense of the amidation reaction of amidating agents to 1 amino equivalent of the partially aminated polyether polyol. If a larger excess of polycarboxylic acid or its acid derivative is used, the hydroxyl groups of the aminated polyether will also be attacked with ester formation. However, the individual ester groups thereby introduced into the end products of the process do not generally have a deleterious effect on the properties of the modified polyether polyols according to the invention.

Amidation according to the invention may, of course, also be carried out on mixtures of various partially aminated polyethers (optionally also polyethers with a differing degree of amination). Moreover, a certain amount of partially aminated low molecular weight polyols may also be included, (e.g. partially aminated butanediol, hexanediol, trimethylolpropane or triethanolamine and preferably N-methyldiethanolamine).

The molecular weight of the products obtained from the process is generally between about 400 and 80,000, preferably between about 700 and 15,000. The modified polyethers obtained are starting components for the production of high quality polyurethane resins and thermoplastic copolyester elastomers as well as antistatic polyamides or polyesteramides and polyether amides.

For information on the production of copolyester elastomers and the co-components used for the process, reference may be made to, for example, to German Offenlegungsschrift No. 2,456,536; U.S. Pat. Nos. 3,023,192; 3,157,619; 3,238,178; 3,243,413; 3,261,812 and 3,277,060 and Canadian Pat. No. 738,042.

Production of the polyurethane resins which are preferably elastomers is also carried out in known manner by reaction of the modified polyether polyols with polyisocyanates and optionally other higher molecular weight compounds having a molecular weight of 400 to 10,000. Such compounds should contain groups capable of reacting with isocyanates and/or low molecular weight chain lengthening agents. Optionally, catalysts, blowing agents and other additives may be used.

The isocyanate components used may be aliphatic, cycloaliphatic, araliphatic, aromatic and heterocyclic polyisocyanates, e.g. those described by W. Siefken in Justus Liebigs Annalen der Chemie, 562, pages 75 to 136. Suitable isocyanates include ethylene diisocyanate; 1,4-tetramethylenediisocyanate; 1,6-hexamethylene diisocyanate; 1,12-dodecane diisocyanate; cyclobutane-1,3-diisocyanate; cyclohexane-1,3- and 1,4- diisocyanate and any mixtures of these isomers; 1-isocyanato-3,3,5-trimethyl-5-isocyanatomethyl-cyclohexane (German Auslegeschrift No. 1,202,785 and U.S. Pat. No. 3,401,190); 2,4- and 2,6-hexahydrotolylene diisocyanate and any mixtures of these isomers; hexahydro-1,3- and/or 1,4-phenylene diisocyanate; perhydro-2,4'- and/or 4,4'-diphenylmethane diisocyanate; 1,3- and 1,4-phenylene diisocyanate; 2,4- and 2,6-tolylene diisocyanate and any mixtures of these isomers; diphenylmethane-2,4' and/or -4,4'-diisocyanate; naphthylene-1,5-diisocyanate; triphenylmethane-4,4',4"-triisocyanate; polyphenyl-polymethylene polyisocyanates of the kind which can be obtained by aniline-formaldehyde condensation followed by phosgenation and which have been described, for example, in British Pat. Nos. 874,430 and 848,671; m- and p-isocyanatophenylsulphonylisocyanates according to U.S. Pat. No. 3,454,606; perchlorinated arylpolyisocyanates such as those described, for example, in German Auslegeschrift No. 1,157,601 (U.S. Pat. No. 3,277,138); polyisocyanates with carbodiimide groups as described in German Pat. No. 1,092,007 (U.S. Pat. No. 3,152,162); the diisocyanates described in U.S. Pat. No. 3,492,330; polyisocyanates with allophanate groups as described e.g. in British Pat. No. 994,890; Belgian Pat. No. 761,626 and published Dutch Patent Application No. 7,102,524; polyisocyanates with isocyanurate groups; e.g. those described in U.S. Pat. No. 3,001,973; German Pat. Nos. 1,022,789; 1,222,067 and 1,027,394 and German Offenlegungsschriften Nos. 1,929,034 and 2,004,048; polyisocyanates with urethane groups as described e.g. in Belgian Pat. No. 752,261 and U.S. Pat. No. 3,394,164; polyisocyanates with acylated urea groups according to German Pat. No. 1,230,778; polyisocyanates with biuret groups as described e.g. in German Pat. No. 1,101,394 (U.S. Pat. Nos. 3,124,605 and 3,201,372) and British Pat. No. 889,050; polyisocyanates prepared by telomerization reactions as described e.g. in U.S. Pat. No. 3,654,106; polyisocyanates with ester groups, for example those mentioned in British Pat. Nos. 965,474 and 1,072,956; U.S. Pat. No. 3,567,763 and German Pat. No. 1,231,688; reaction products of the above mentioned isocyanates with acetals according to German Pat. No. 1,072,385 and polyisocyanates containing polymeric fatty acid groups according to U.S. Pat. No. 3,455,883.

Distillation residues which still contain isocyanate groups from the commercial production of isocyanates may also be used, optionally as solutions in one or more of the above mentioned polyisocyanates. Any mixtures of the above mentioned polyisocyanates may also be used.

It is generally preferred to use readily available polyisocyanates such as 2,4- and 2,6-tolylene diisocyanate and any mixtures of these isomers ("TDI"), polyphenyl-polymethylene polyisocyanates obtained by aniline-formaldehyde condensation followed by phosgenation ("crude MDI") and polyisocyanates containing carbodiimide groups, urethane groups, allophanate groups, isocyanurate groups, urea groups or biuret groups ("modified polyisocyanates").

The starting components with at least two isocyanate-reactive hydrogen atoms and a molecular weight of generally 400 to 40000 which may be included according to the invention may be compounds containing amino groups, thiol groups or carboxyl groups but are preferably polyhydroxyl compounds. Particularly useful are compounds having from 2 to 8 hydroxyl groups and especially those with a molecular weight of from 800 to 40000, preferably 1000 to 8000. Useful polyhydroxyl compounds include the polyesters, polyethers, polythioethers, polyacetals, polycarbonates and polyester amides with at least 2, generally 2 to 8 and preferably 2 to 4 hydroxyl groups which are known per se for the production of both homogeneous and cellular polyurethanes.

The hydroxyl polyesters which may be used according to the invention include e.g. reaction products of polyhydric, preferably dihydric alcohols to which trihydric alcohols may be added and polybasic, preferably dibasic, carboxylic acids. Instead of using free polycarboxylic acids for preparing the polyesters, the corresponding polycarboxylic acid anhydrides or corresponding polycarboxylic acid esters of lower alcohols or mixtures thereof may be used. The polycarboxylic acids may be aliphatic, cycloaliphatic, aromatic and/or heterocyclic and they may be substituted, e.g. with halogen atoms, and/or unsaturated. The following are mentioned as examples: Succinic acid, adipic acid, suberic, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as maleic acid optionally mixed with monomeric fatty acids, dimethylterephthalate and bis-glycol terephthalate. Suitable polyhydric alcohols include e.g. ethylene glycol, polypropylene glycol-(1,2) and -(1,3), butylene glycol- (1,4) and -(2,3), hexanediol-(1,6), octanediol-(1,8), neopentyl glycol, cyclohexane dimethanol (1,4-bis-hydroxymethylcyclohexane), 2-methyl-1,3-propanediol, glycerol, trimethylolpropane, hexanetriol-(1,2,6), butane triol-(1,2,4), trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones such as ε-caprolactone or hydroxycarboxylic acids such as ω-hydroxycaproic acid may also be used.

The polyethers which may be used may be any of the above mentioned unmodified polyether polyols.

Among the polythioethers should be particularly mentioned the condensation products obtained by condensing thiodiglycol on its own and/or with other glycols, dicarboxylic acids, formaldehyde, aminocarboxylic acids or amino alcohols. The products obtained are polythio mixed ethers, polythioether esters or polythioether ester amides, depending on the co-components.

Suitable polyacetals include e.g. the compounds which can be prepared from glycols such as diethylene glycol, triethylene glycol, 4,4'-dihydroxyethoxydiphenyldimethylmethane and hexanediol and formaldehyde. Suitable polyacetals for the process according to the invention may also be obtained by polymerization of cyclic acetals.

Suitable hydroxyl polycarbonates are known per se and include e.g. the compounds which can be obtained by reacting diols such as propanediol-(1,3), butanediol-(1,4) and/or hexanediol-(1,6), diethylene glycol, triethylene glycol or tetraethylene glycol with diaryl carbonates such as diphenylcarbonate or phosgene.

Suitable polyester amides and polyamides include e.g. the predominantly linear condensates obtainable from polybasic saturated and unsaturated carboxylic acids or their anhydrides and polyvalent saturated and unsaturated amino alcohols, diamines, polyamines and mixtures thereof.

Chain lengthening agents with a molecular weight of from 32 to 400 which may be used in the process according to the invention are also known per se. They also contain at least 2, preferably 2 or 3 groups which are reactive with isocyanates. The following are mentioned as examples of such compounds: Ethylene glycol, propylene glycol-(1,2) and -(1,3), butylene glycol-(1,4) and -(2,3), pentanediol-(1,5), hexanediol-(1,6), octanediol-(1,8), neopentyl glycol, 1,4-bis-hydroxymethyl-cyclohexane, 2-methyl-propanediol-(1,3), glycerol, trimethylolpropane, hexanetriol-(1,2,6), trimethylethane, pentaerythritol, quinitol, mannitol, sorbitol, diethylene glycol, triethylene glycol, tetraethylene glycol, polyethylene glycols with a molecular weight of up to 400, dipropylene glycol, polypropylene glycols with a molecular weight of up to 400, dibutylene glycol, polybutylene glycols with a molecular weight of up to 400, 4,4'-dihydroxy-diphenyl propane, dihydroxymethyl hydroquinone, ethanolamine, diethanolamine, triethanolamine and 3-aminopropanol.

Suitable aliphatic diamines for the process according to the invention include, for example, ethylene diamine, tetramethylene-1,4-diamine, undecamethylene-1,11-diamine, dodecamethylene-1,12-diamine and mixtures thereof, 1-amino-3,3,5-trimethyl-5-aminomethylcyclohexane, hexahydrotolylene-2,4- and 2,6-diamine and mixtures thereof, perhydro-2,4'- and 4,4'diaminodiphenylmethane, p-xylylenediamine, bis-(3-aminopropyl)-methylamine, and the like. Hydrazine and substituted hydrazines such as methylhydrazine or N,N'-dimethylhydrazine and their homologues and acid dihydrazides may also be used according to the invention. Suitable compounds include carbodihydrazide, oxalic acid dihydrazide, the dihydrazides of malonic acid, succinic acid, glutaric acid, adipic acid, β-methyladipic acid, sebacic acid, hydracrylic acid and terephthalic acid. Also useful are semicarbazico-alkylene hydrazides such as β-semicarbazidopropionic acid hydrazide (German Offenlegungsschrift No. 1,770,591) semicarbazidoalkylenecarbazic esters such as 2-semicarbazidoethylcarbazic ester (German Offenlegungsschrift No. 1,918,504) or aminosemicarbazide compounds such as β-aminoethyl-semicarbazidocarbonate (German Offenlegungsschrift No. 1,902,931).

Examples of suitable aromatic diamines include bisanthranilic acid esters according to German Offenlegungsschriften Nos. 2,040,644 and 2,160,590; 3,5- and 2,4- diaminobenzoic acid esters according to German Offenlegungsschrift No. 2,025,900; diamines with ester groups as described in German Offenlegungsschriften Nos. 1,803,635, 2,040,650 and 2,160,589; 3,3'-dichloro-4,4'-diaminodiphenylmethane tolylenediamine; 4,4'-diaminodiphenylmethane and 4,4'-diaminodiphenyldisulphides.

Compounds such as 1-mercapto-3-aminopropane, substituted or unsubstituted amino acids such as glycine, alanine, valine, serine and lysine and substituted or unsubstituted dicarboxylic acids such as succinic acid, adipic acid, phthalic acid, 4-hydroxyphthalic acid and 4-aminophthalic acid may also be used as chain lengthening agents according to the invention.

Compounds which are monofunctional in their reaction with isocyanates may also be included as co-called chain breaking agents in quantities of from 0.01 to 10% by weight, based on the polyurethane solid content. Examples of such monofunctional compounds include monoamines such as butylamine and dibutylamine, octylamine, stearylamine, N-methylstearylamine, pyrrolidine, piperidine and cyclohexylamine, monohydric alcohols such as butanol, 2-ethylhexanol, octanol and dodecanol, the various amyl alcohols, cyclohexanol, ethylene glycol monoether, and the like.

For the production of cellular polyurethane resins from the polyether polyols which have been modified according to the invention, water and/or readily volatile organic substances are used as blowing agents. Suitable organic blowing agents include e.g. acetone; ethyl acetate; halogenated alkanes such as methylene chloride, chloroform, ethylidene chloride, vinylidene chloride, monofluorotrichloromethane, chlorodifluoromethane and dichlorodifluoromethane as well as butane, hexane, heptane or diethylether. The effect of a blowing agent can also be obtained by adding compounds which decompose at temperatures of above room temperature to liberate gases such as nitrogen, e.g. azo compounds such as azoisobutyric acid nitrile. Other examples of blowing agents and details concerning the use of blowing agents may be found in Kunststoff-Handbuch, Volume VIII, by Vieweg and Höchtlen, Carl-Hanser-Verlag, Munich 1966, e.g. on pages 108 and 109, 453 to 455 and 507 to 510.

Catalysts are often used in the process according to the invention. The catalysts may be known per se, e.g. tertiary amines such as triethylamine, tributylamine, N-methyl-morpholine, N-ethylmorpholine, N-cocomorpholine, N,N,N',N'-tetramethyl-ethylenediamine, 1,4-diaza-bicyclo-(2,2,2)-octane, N-methyl-N'-dimethylaminoethyl-piperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-$\beta$-phenylethylamine, 1,2-dimethylimidazole or 2-methylimidazole. Suitable catalysts also include the known Mannich bases obtained from secondary amines, such as dimethylamine and aldehydes, preferably formaldehyde, or ketones such as acetone, methyl ethyl ketone or cyclohexanone and phenols such as phenol, nonylphenol or bisphenol.

Tertiary amines with isocyanate-reactive hydrogen atoms used as catalyst include e.g. triethanolamine, triisopropanolamine, N-methyldiethanolamine, N-ethyldiethanolamine, N,N-dimethyl-ethanolamine and their reaction products with alkylene oxides such as propylene oxide and/or ethylene oxide.

Silaamines with carbon-silicon bonds such as those described e.g. in German Patent Specification No. 1,229,290 (corresponding to U.S. Pat. No. 3,620,984) may also be used as catalysts, e.g. 2,2,4-trimethyl-2-silamorpholine or 1,3-diethylaminomethyl-tetramethyl-disiloxane.

The catalysts used may also be basic nitrogen compounds such as tetraalkylammonium hydroxides, alkali metal hydroxides such as sodium hydroxide, alkali metal phenolates such as sodium phenolate or alkali metal alcoholates such as sodium methylate. Hexahydrotriazines are also suitable catalysts.

Organic metal compounds may also be used as catalysts according to the invention, particularly organic tin compounds.

The organic tin compounds used are preferably tin (II) salts of carboxylic acids such as tin (II) acetate, tin (II) octoate, tin (II) ethylhexoate and tin (II) laurate and compounds of tetravalent tin such as dibutyl tin oxide, dibutyl tin dichloride, dibutyl tin diacetate, dibutyl tin dilaurate, dibutyl tin maleate or dioctyl tin diacetate.

Any of the above mentioned catalysts may, of course, also be used as mixtures.

Other examples of catalysts which may be used according to the invention and details concerning the activity of the catalysts may be found in Kunststoff-Handbuch, Volume VII, by Vieweg and Höchtlen, Carl-Hanser-Verlag, Munich 1966, e.g. on pages 96 to 102.

The catalysts are generally used in a quantity of between about 0.001 and 10% by weight, based on the quantity of compounds with a molecular weight of from 400 to 40000 which have at least two isocyanate reactive hydrogen atoms.

Surface active additives such as emulsifiers and foam stabilizers may also be used according to the invention. Suitable emulsifiers include e.g. the sodium salts of ricinoleic sulphonates or salts of fatty acids with amines such as oleic acid diethylamine or stearic acid diethanolamine. Alkali metal or ammonium salts of sulphonic acids such as dodecylbenzene sulphonic or dinaphthylmethane disulphonic acid or of fatty acids such as ricinoleic acid or of polymeric fatty acids may also be used as surface active additives.

The foam stabilizers used are mainly polyether siloxanes, especially those which are water soluble. These compounds generally have a polydimethylsiloxane group attached to a copolymer of ethylene oxide and propylene oxide. Foam stabilizers of this kind have been described, for example, in U.S. Pat. Nos. 2,834,748; 1,917,480 and 3,629,308.

Other additives which may be used according to the invention include reaction retarders, e.g. compounds which are acid in reaction such as hydrochloric acid or organic acid halides, cell regulators know per se such as paraffins or fatty alcohols or dimethylpolysiloxanes, pigments, dyes, flame retarding agents known per se such as trischloroethylphosphate, tricresyl phosphate or ammonium phosphate and polyphosphate, stabilizers against ageing and weathering, plasticizers, fungistatic and bacteriostatic substances and fillers such as barium sulphate, keiselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may also be used according to the invention and details concerning their mode of action and methods of using them have been described in Kunststoff-Handbuch, Volume VII, by Vieweg and Höchtlen, Carl-Hanser-Verlag, Munich 1966, e.g. on pages 103 to 113.

According to the invention, the reactants are reacted by the known one-shot, prepolymer or semiprepolymer process, often using mechanical devices such as those described in U.S. Pat. No. 2,764,565. Details concerning processing apparatus which may also be used according to the invention may be found in Kunststoff-Handbuch, Volume VII by Vieweg and Höchtlen, Carl-Hanser-Verlag, Munich 1966, e.g. on pages 121 to 205.

According to the invention, foaming of the reaction mixture to produce the foams is often carried out inside molds. The reaction mixture is introduced into a mold made of a metal such as aluminium or a synthetic resin such as an epoxide resin in which it foams up to form the molded product. This process may be carried out to produce a product with a cellular structure on its surface or it may be carried out to produce a molded product having a noncellular skin and cellular center. According to the invention, one or other result may be obtained by either introducing just as much reaction mixture into the mold as is required to fill the mold with foam or introducing a larger quantity of foamable reaction mixture. The latter method is known as overcharging and has already been disclosed for example in U.S. Pat. Nos. 1,178,490 and 3,182,104.

So-called external mold release agents such as silicone oils are frequently used when foaming is carried out inside molds. The so-called internal mold release agents such as those disclosed, for example, in German Offenlegungsschriften Nos. 2,121,670 and 2,307,589 may also be used, optionally in combination with external mold release agents.

Cold setting foams may also be used according to the invention (see British Pat. No. 1,162,517 and German Offenlegungsschrift No. 2,153,086).

The foams may, of course, also be produced by block foaming or by the laminator process known per se.

Polyurethane resins produced from polyether polyols which have been modified according to the invention are substantially improved in their mechanical properties compared with polyurethane resins obtained from unmodified polyethers. It is surprisingly found that this improvement in properties is much more marked than that obtained when using polyether polyols which have been modified by the conventional method of introducing urethane groups (i.e. by reaction with a less than equivalent quantity of polyisocyanates).

The following Examples serve to explain the invention. The compositions are by parts by weight or percentages by weight unless otherwise indicated.

EXAMPLE 1

1000 g of polybutylene glycol (hydroxyl number 112) are 40.3% aminated by reaction with ammonia at 200° C and a hydrogen pressure of 30 bar in the presence of Raney nickel as catalyst. The product is dissolved in 4 liters of toluene. 77.4 g of adipic acid dichloride dissolved in 0.5 liters of toluene and 33.8 g of sodium hydroxide dissolved in 0.5 liters of water are added simultaneously with vigorous stirring over a period of one hour at room temperature. The reaction mixture is then stirred for a further 2 hours and the resulting precipiate is separated off and the solvent removed under vacuum. 1020 g of modified polyether are obtained (97.5% of the theory).

The IR spectra indicate that the product obtained is a polyether polyamidopolyol. No more amino end groups could be detected within the limits of error by titration with $10/n$ — $HClO_4$ in glacial acetic acid (less than 0.1 ml used up for 2 g of polymer polyol) or by determination by van Slyke's method. The modified polyether has a hydroxyl number of 61.4.

EXAMPLE 2

The procedure is the same as in Example 1 but 1000 g of polypropylene glycol having an average molecular weight of 2000 are used as starting material and aminated to an extent of 69.4%. 74.2 g of isophthalic acid dichloride dissolved in 0.5 liters of toluene and 0.05 liters of dimethylformamide and 29.8 g of sodium hydroxide in 0.5 liters of water are used for amidation.

Yield: 1015 g = 97.0% of the theory,
Hydroxyl number: 17.1.

The product is identified and characterized as in Example 1.

EXAMPLE 3

A polypropylene glycol ether (hydroxyl number 56) is 20% aminated with methylamine under the conditions described in Example 1.

1000 g of the partially aminated polypropylene glycol ether are reacted as described in Example 1 with 28.4 g of sebacic acid dichloride dissolved in 0.5 liter of toluene and 8 g of sodium hydroxide solution in 0.3 liter of water.

Yield: 948 g $\triangleq$ 96.8% of the theory.
The hydroxyl number of the amidopolyether is 47.5.

EXAMPLE 4

The procedure is the same as described in Example 3 but using 1000 g of a polytetrahydrofuran (original hydroxyl number 112) which has been 56% aminated with methylamine. The partially aminated product is amidated with 119.3 g of terephthalic acid dichloride dissolved in 0.5 liter of toluene and 0.05 liter of dimethylformamide, and 27 g of sodium hydroxide in 180 ml of water.

Yield 1035 g $\triangleq$ 96.1% of the theory.
Hydroxyl number: 42.3.

EXAMPLE 5

The method used is the same as described in Example 1. A block polyether of polypropylene oxide and polyethylene oxide having an average molecular weight of 4000 is first aminated to an extent of 65.5% with ammonia. 1000 g of the partially aminated polyether obtained is then amidated with 34.4 g of terephthalic acid dichloride dissolved in 0.50 liter of toluene and 0.05 liter of dimethylformamide, and 13.5 g of sodium hydroxide solution in 0.5 liters of water.

Yield: 995 g $\triangleq$ 97.2% of the theory.
The hydroxyl number of the amidopolyether polyol is 9.5.

EXAMPLE 6

The procedure is the same as described in Example 1. 1000 g of a polypropylene glycol (average molecular weight 2000 at beginning of process) is 58% aminated with ammonia. The partially aminated polypropylene glycol is then amidated with 62.1 g of terephthalic acid dichloride dissolved in 0.5 liter of toluene and 0.05 liter of dimethylformamide and 51.1 g of sodium bicarbonate in 0.5 liter of water.

Yield: 1030 g $\triangleq$ 98.8% of the theory,
Hydroxyl number 26.3.

EXAMPLE 7

The procedure is the same as described in Example 1. A solution in 6 liters of toluene of a mixture of 1000 g of a polypropylene glycol (starting molecular weight 2000) which has been 86% aminated with ammonia and 500 g of a polytetrahydrofuran (starting molecular weight 1000) which has been 77.5% aminated with ammonia is amidated with 174.4 g of terephthalic acid dichloride dissolved in 0.8 liter of toluene and 0.08 liter of dimethylformamide and 68.7 g of sodium hydroxide in 0.5 liter of water.

Yield: 1590 g ≙ 98.6% of the theory,
Hydroxyl number: 14.1.

EXAMPLE 8

The procedure is the same as described in Example 3. A mixture of 1000 g of a polypropylene glycol (starting molecular weight 2000) which has been 20% aminated with methylamine and 500 g of a polytetrahydrofuran (starting molecular weight 1000) which has been 56% aminated with methylamine, dissolved in 6 liters of toluene is amidated with 80.9 g of terephthalic acid dichloride dissolved in 0.8 liters of toluene and 0.08 liters of dimethylformamide and 31.9 g of sodium hydroxide in 0.5 liters of water.

Yield: 1520 g ≙ 97.7% of the theory,
Hydroxyl number: 47.2.

EXAMPLE 9

Polypropylene glycol (hydroxyl number 56) is 51% aminated with ammonia under pressure as described in Example 1. 76.5 g of adipic acid are added to 1000 g of the resulting product. After careful removal of oxygen, the reaction mixture is heated to 235° C with stirring in a nitrogen atmosphere and kept at this temperature for 8 hours. The water formed in the reaction is distilled off. A highly viscous polymer is obtained in 99.5% yield (1050 g). Hydroxyl number: 27.2. Analysis and identification of the product were carried out as described in Example 1.

EXAMPLE 10

The procedure is the same as described in Example 9. 1000 g of a polybutylene glycol (starting molecular weight 1000) which has been 49% aminated with ammonia are amidated with 87.5 g of adipic acid dimethylester and 1.05 g of sodium methylate at 205° C. The catalyst was removed after the reaction by dissolving the reaction mixture in 3 liters of methylene chloride, adding 3 liters of water, introducing $CO_2$ for 15 minutes and subsequently extracting with 2 liter portions of water.

Yield: 1065 g (98.3% of the theory).
Hydroxyl number: 54.3.

EXAMPLE 11

The procedure is the same as described in Example 1. A solution in 2 liters of toluene of 400 g of a polypropylene glycol (starting molecular weight 1000) which has been 44.6% aminated with ammonia is amidated with 38.0 g of terephthalic acid dichloride dissolved in 250 ml of toluene and 10 ml of dimethylformamide and 15.0 g of sodium hydroxide dissolved in 0.25 liters of water.

Yield: 421 g (98.9% of the theory)
Hydroxyl number: 56.5.

EXAMPLE 12

The procedure is the same as described in Example 3. 650 g of a polypropylene glycol (average starting molecular weight 1000) which has been 22.8% aminated with methylamine, dissolved in 2.5 liters of toluene, are amidated with 31.6 g of terephthalic acid dichloride dissolved in 300 ml of toluene and 10 ml of dimethylformamide, and 12.5 g of sodium hydroxide dissolved in 300 ml of water.

Yield: 660 g (98.4% of the theory)
Hydroxyl number: 87.5.

EXAMPLE 13

The procedure is the same as described in Example 1. 1000 g of a polypropylene glycol (starting molecular weight 1000) which has been 44.6% aminated with ammonia, dissolved in 5 liters of toluene, are amidated with 85.6 g of adipic acid dichloride dissolved in 625 ml of toluene and 37.4 g of sodium hydroxide dissolved in 625 ml of water.

Yield: 1035 g (98.1% of the theory)
Hydroxyl number: 64.5.

EXAMPLE 14

93.5 g of modified polypropylene glycol from Example 11 and 50 g of unmodified polypropylene glycol (molecular weight 1000) are mixed with 77.5 g of 4,4'-diisocyanatodiphenyl methane and stirred for 30 minutes at 120° C. A further 2.9 g of 4,4'-diisocyanatodiphenylmethane is then added and the mixture degasified at 120° C (75 Torr) for 3 minutes. 19 g of butane-1,4-diol are then added at 100° C. The mixture is stirred for a further 20 seconds and then poured out on a preheated plate (110° C) where it is heated at 110° C for 24 hours. A polymer having the following properties is obtained:

| Tensile strength: | (DIN 53504) | 23.5 MPa |
| Elongation at break: | (DIN 53504) | 480% |
| Dimensional stability | (DIN 53504) | 343 N |
| Shore Hardness | (DIN 53505) | 78 |

When an unmodified polypropylene glycol is used under otherwise identical conditions, a polymer having the following properties is obtained (for DIN standards see above):

| Tensile strength: | 13.5 MPa |
| Elongation at break: | 360% |
| Dimensional stability: | 278 N |
| Shore Hardness | 78 |

EXAMPLE 15

A mixture of 64 g of the modified polypropylene glycol from Example 12, 100 g of an unmodified polypropylene glycol (molecular weight 2000) and 36.5 g of tolylene diisocyanate (65% 2,4-isomer, 35% 1,6-isomer) is stirred at 120° C for 30 minutes. A further 1.42 g of tolylene diisocyanate is then added and the mixture is degasified at 120° C and 75 Torr for 3 minutes. 25.2 g of 3,5-diamino-4-chlorobenzoic acid isobutyl ester are then added. The reaction mixture is stirred for 20 seconds and then poured on a preheated plate (110° C) where it is heated at 110° C for 24 hours. A polymer having the following properties is obtained:

| Tensile strength: | 10.5 MPa |
| Elongation at break: | 810% |
| Dimensional stability: | 308 N |
| Shore hardness: | 86 |

When an unmodified polypropylene glycol of the same molecular weight is treated under similar conditions, a polymer having the following properties is obtained:

| Tensile strength: | 6.5 MPa |
|---|---|
| Elongation at break: | 390% |
| Dimensional stability: | 250 N |
| Shore hardness | 82 |

EXAMPLE 16

187 g of the modified polypropylene glycol according to Example 11 and 36.5 g of tolylene diisocyanate (80% 2,4-isomer, 20% 2,6-isomer) are stirred together for 30 minutes at 120° C. A further 1.6 g of tolylene diisocyanate is then added and the mixture is degasified at 120° C and 75 Torr for 3 minutes. After the addition of 25.2 g of 3,5-diamino-4-chlorobenzoic acid isobutyl ester, the reaction mixture is stirred for a further 20 seconds. It is then poured on a preheated plate (110° C) and heated at 110° C for 24 hours. A polymer having the following properties is obtained:

| Tensile strength | 14.3 MPa |
|---|---|
| Elongation at break: | 610% |
| Dimensional stability: | 354 N |
| Shore hardness: | 85 |

When an unmodified polypropylene glycol of the same molecular weight is used under otherwise similar conditions, a polymer having the following properties is obtained:

| Tensile strength: | 8.9 MPa |
|---|---|
| Elongation at break | 490% |
| Dimensional stability: | 320 N |
| Shore hardness | 90 |

EXAMPLE 17

A mixture of 95.7 g of the modified polypropylene glycol from Example 13, 60 g of an unmodified polypropylene glycol (molecular weight 1000) and 93 g of 4,4'-diisocyanatodiphenyl methane is stirred at 120° C for 30 minutes. A further 3.6 g of 4,4'-diisocyanatodiphenylmethane is then added and the mixture is degasified at 120° C and 75 Torr for 3 minutes. 22.6 g of butane-1,4-diol are then added. The reaction mixture is stirred for a further 20 seconds and then poured on a preheated plate (110° C) and heated at 110° C for 24 hours. A polymer having the following properties is obtained:

| Tensile strength: | 25.8 MPa |
|---|---|
| Elongation at break: | 420% |
| Dimensional stability: | 435 N |
| Shore hardness: | 78 |

When an unmodified polypropylene glycol of the same molecular weight is used under otherwise the same conditions, a polymer having the following properties is obtained:

| Tensile strength: | 13.5 MPa |
|---|---|
| Elongation at break: | 360% |
| Dimensional stability: | 278 N |
| Shore hardness: | 78 |

What is claimed is:

1. A process for the preparation of a polyether polyol containing amide groups, comprising (a) converting 10 to 95% of the hydroxyl groups of a polyether polyol, having a molecular weight of from about 150 to 40,000, into amino or alkylamino or arylamino groups or mixtures thereof and (b) reacting the resulting partially aminated polyether polyol in an amidation reaction with a compound selected from the group consisting of a polycarboxylic acid, polycarboxylic acid anhydride, polycarboxylic acid ester, carboxylic acid halide or mixture thereof said compound having a functionality in the sense of the amidation reaction of from 2 to 4.

2. The process of claim 1 wherein the polyether polyol has from 2 to 8 hydroxyl groups and a molecular weight between about 150 to 40,000.

3. The process of claim 2 wherein the polyether polyol has 2 hydroxyl groups.

4. The process of claim 1 wherein 10 to 95% of the hydroxyl groups are converted.

5. The process of claim 1 wherein the compound reacting with the partially aminated polyether polyol has a basicity of from 2 to 4.

6. The process of claim 1 wherein the compound reacting with the partially aminated polyether polyol is selected from the group consisting of adipic acid dichloride, isophthalic acid dichloride, sebacic acid dichloride, terephthalic acid dichloride, adipic acid and adipic acid dimethylester.

7. The process of claim 1 wherein the compound reacting with the partially aminated polyether polyol is used in a quantity of about 1.0 to 1.05 equivalents of the reacting compound to 1 amino equivalent.

8. Process according to claim 1, wherein mixtures of various partially aminated polyether polyols, optionally with differing degrees of amination, are used for the amidation reaction.

9. Process according to claim 1 wherein the products used for the amidation reaction also include partially aminated low molecular weight polyols.

10. Process according to claim 1 wherein the amidation is carried out in the presence of a solvent selected from the group consisting of toluene, dioxane, N-methylpyrrolidone, halogenated alkanes or dimethylformamide.

11. The process of claim 1 wherein the polyether polyol is selected from the group consisting of polypropylene glycol, polytetrahydrofuran, polyethylene glycol or a copolymer of ethylene oxide and propylene oxide.

12. The process of claim 1 wherein the conversion of the hydroxyl groups into amino or alkylamino or arylamino groups or mixture thereof is carried out by direct reaction of the polyether polyols with ammonia and/or primary amines in the presence of catalysts under pressure.

13. Polyether diols containing amide groups in accordance with the following formula:

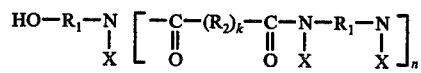

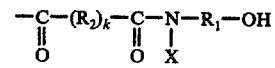

wherein $R_1$ denotes identical or different alkylene groups having a molecular weight of between 148 and 40000 and containing at least two ether groups, $R_2$ denotes divalent aliphatic, cycloaliphatic araliphatic or aromatic groups having from 1 to 15 carbon atoms and X denotes hydrogen or a straight chain or branched chain $C_1$-$C_6$ alkyl group and $n$ represents an integer of between 0 and 100

$k$ represents 0 or 1.

14. The polyether diols of claim 13 wherein $R_2$ is a group with 2 to 12 carbon atoms.

15. The polyether diols of claim 13 wherein $n$ is between 0 and 10.

16. In a process for the production of polyurethane resins by reacting polyisocyanates with compounds containing isocyanate reactive hydrogen atoms optionally in the presence of chain lengthening agents having a molecular weight of from 32 to 400, blowing agents, catalysts and other additives, the improvement wherein the isocyanate reactive compounds comprise the product of a process wherein 10 to 95% of the hydroxyl groups of a polyether polyol, having a molecular weight of from about 150 to 40,000, are converted into amino or alkylamino or arylamino groups or mixtures thereof and wherein the resulting partially aminated polyether polyol is amidated by reaction with a compound selected from the group consisting of a polycarboxylic acid, a polycarboxylic acid ester, a polycarboxylic acid anhydride, a polycarboxylic acid halide or mixture thereof said compound having a functionality in the sense of the amidation reaction of from 2 to 4.

17. The process of claim 16 wherein the product of the amidation reaction has a molecular weight between about 400 to 80,000.

* * * * *